United States Patent [19]

Doorakian et al.

[11] 4,189,543
[45] Feb. 19, 1980

[54] CATALYST FOR MAKING POLYURETHANES

[75] Inventors: George A. Doorakian, Bedford; Lawrence G. Duquette, Maynard, both of Mass.; Philip W. McGraw, Lake Jackson, Tex.

[73] Assignee: The Dow Chemical Company, Midland, Mich.

[21] Appl. No.: 935,233

[22] Filed: Aug. 21, 1978

[51] Int. Cl.² ............... C08G 18/20; G08G 18/14
[52] U.S. Cl. ............... 521/128; 260/45.8 N; 528/53
[58] Field of Search ............ 521/128; 528/53; 260/45.8 N

[56] References Cited

U.S. PATENT DOCUMENTS

| | | | |
|---|---|---|---|
| 3,152,094 | 10/1964 | Erner et al. | 521/129 |
| 3,177,223 | 4/1965 | Erner | 521/129 |
| 3,912,689 | 10/1975 | Bechara et al. | 521/129 |
| 4,025,466 | 5/1977 | Jourquin et al. | 521/129 |
| 4,041,019 | 8/1977 | McGraw et al. | 521/121 |
| 4,067,831 | 1/1978 | Wasilczyk | 521/121 |
| 4,102,857 | 7/1978 | Avar et al. | 260/45.8 N |

*Primary Examiner*—H. S. Cockeram
*Attorney, Agent, or Firm*—L. Wayne White; Michael L. Glenn

[57] ABSTRACT

Compounds of formulas I and II are heat-activated catalysts used in making polyurethanes.

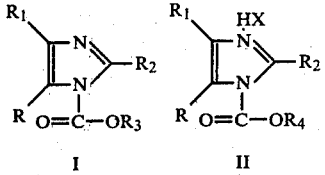

wherein R, $R_1$, and $R_2$ are each independently H, hydrocarbyl or an inertly-substituted hydrocarbyl; $R_3$ and $R_4$ are each independently hydrocarbyl or an inertly-substituted hydrocarbyl; and X is an anion. Upon heating, Compounds I and II catalyze the reaction and may release gaseous by-products which cause the resulting polyurethane compound to foam. For example, the catalyst, t-butyl imidazole-N-carboxylate, when heated to 120° C., catalyzes the reaction between a polyol and a polyisocyanate to give a foamed polyurethane which cured in 16 minutes.

9 Claims, No Drawings

CATALYST FOR MAKING POLYURETHANES

BACKGROUND OF THE INVENTION

1. Field of the Invention

This invention pertains to the production of polyurethane foams through the use of delayed-action, heat-activated catalysts some of which release by-products at reaction temperature and foam the resulting polyurethane.

2. Description of the Prior Art

The reaction of polyisocyanates with polyols to form polyurethanes is a known process.

Activators or catalysts are used to increase the reaction rate of the polyisocyanate and the polyols. The usual commercial catalysts are amines (e.g., triethylenediamine), organo-metal compounds (e.g., stannous octoate) or some combination of the two. However, these catalysts are so effective that they detrimentally shorten the doctorability time in some processes (such as carpet foam-backing). To obtain a reasonable doctorability period with conventional commercial urethane catalysts, it is necessary to use a low catalyst level which causes the final cure to be slow and inadequate.

Various blowing or foaming agents are used, air, water, and low boiling inert liquids being the most common. Water reacts with the isocyanate groups, forming carbon dioxide. The low boiling liquids (e.g., trichlorofluoromethane) evaporate due to the exothermic polymerization reaction, causing foaming.

Erner et al. (U.S. Pat. No. 3,152,094) describe a class of imidazole catalysts that are unreactive at ambient temperatures, but effective catalysts at higher temperatures. These catalysts are represented by the formula

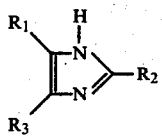

wherein $R_2$ is hydrogen, alkyl or benzyl; $R_1$ and $R_3$ are hydrogen, alkyl, benzyl, or joined to form a 6-membered carbocyclic ring, provided that the total number of carbon atoms in the substituents $R_1$, $R_2$ and $R_3$ does not exceed 12.

Delayed-action, heat-activated catalysts are presented by McGraw et al. in U.S. Pat. No. 4,041,019. The catalysts correspond to the formula

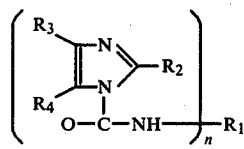

wherein n is an integer of from 1 to 3; $R_1$ is an n-valent organic radical; $R_2$ is hydrogen, hydrocarbyl or inertly-substituted hydrocarbyl; $R_3$ and $R_4$ are each independently hydrogen, hydrocarbyl, inertly-substituted hydrocarbyl, or, $R_3$ and $R_4$ are joined to form a 5- or 6-membered carbocyclic ring.

Wasilczyk, in U.S. Pat. No. 4,067,831 describes a process for preparing polyurethane foams. The foaming is done in the presence of a certain delayed-action catalyst. These catalysts are reaction products of various isocyanates with certain imidazoles. However, these delayed-action catalysts are used in addition to the conventional catalysts.

SUMMARY OF THE INVENTION

A new process has been discovered for the formulation of polyurethane polymers using a delayed-action, heat-activated catalyst. The classes of catalysts are represented by formulas I and II:

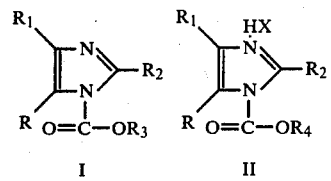

wherein R, $R_1$, and $R_2$ are each independently H, hydrocarbyl, or an inertly-substituted hydrocarbyl; $R_3$ and $R_4$ are each independently hydrocarbyl or an inertly-substituted hydrocarbyl; and X is an anion.

DETAILED DESCRIPTION OF THE INVENTION

Using the above delayed-action, heat-activated catalysts increases the doctorability time or puddle life of the polyurethane reaction mixture at room temperature. Doctorability time or puddle life is the period before the reaction mixture hardens or sets and is needed so that the reaction mixture can be poured or molded.

The novel delayed-action catalysts I and II are essentially inactive at room temperature and do not promote polymerization until the polyurethane reaction mixture is heated. At elevated temperatures, however, the novel catalysts I and II catalyze the polyurethane reaction and some release gaseous products, which foam the polyurethane product. Reaction temperatures required to activate the catalysts are from about 80° C. to about 150° C. The preferred temperature range is from about 115° C. to about 125° C.

The class of compounds represented by formulas I and II is a known class of compounds; the members of which can be prepared by various known techniques. For example, one method of preparation (the preparation of t-butyl imidazole-N-carboxylate) is discussed by H. A. Stack in *Liebigs Ann. Chem.*, 609, 75 (1957). The class of compounds encompassed by the formulas I and II are generically, 1-H-imidazole-1-carboxylic acids, and the esters and mono salts of said acids. Examples of such compounds include those represented by I having the R through $R_4$ values set forth in Table I.

TABLE I

| —R | —$R_1$ | —$R_2$ | —$R_3$ | —$R_4$ |
|---|---|---|---|---|
| H | H | H | $CH_2CH_3$ | $CH_3$ |
| $CH_3$ | $CH_3$ | $CH_3$ | $CH_2CH_3$ | $CH_3$ |
| H | $CH_3$ | $CH_3$ | $C_6H_5Br$ | $CH_2CH_3$ |
| $CH_2CH_3$ | $CH_3$ | $CH_2C_6H_5$ | $C_6H_5CH_2$ | $(CH_3)_2CH$ |
| $CH_3$ | $C_6H_5$ | H | $CH_3$ | $CH_3(CH_2)_5$ | and the corresponding chloride, bromide, bisulfate, acetate, benzoate, and adipate salts thereof, and the like.

The polyols used in making urethanes form a known class of compounds having many members. Examples of this class include polyether polyols, polyester polyols, and the like or mixtures thereof. These polyols are described in the literature. See, for example, "Polyurethanes: Chemistry and Technology Parts I and II", by Saunders & Frisch, Interscience, 1964.

Any organic polyisocyanate conventionally employed in the preparation of urethanes can be employed in the process of the instant invention. This also includes isocyanato-containing prepolymers prepared by reacting various polyols with polyisocyanates and thus producing a product having residual isocyanate groups. Such polyisocyanates are likewise described in the Saunders & Frisch publication. Particularly suitable polyisocyanates include, toluene diisocyanate, methylene diphenyl diisocyanate, and polymethylene polyphenyl isocyanates.

In addition to the polyisocyanate and polyol reactants and the instant delayed-action catalyst, the thermally curable polyurethane composition may likewise comprise cell control agents, blowing agents, colorants, inert fillers and the like. Such ingredients are also discussed in the Saunders & Frisch publication. Inert fillers (e.g., silica, aluminum, trihydrate, calcium carbonate, barium sulfate, carbon black, mica, titanium dioxide, and the like) and their preparation are known to those skilled in the polyurethane art.

Generally, the catalysts can be used in making flexible urethane foams, rigid and semi-rigid foams, and mechanical-frothed foams.

The preferred utility for this invention is in the formation of a foam carpet-backing.

The following examples further illustrate the instant invention, but are not to be construed as limitations.

EXAMPLES 1–8

An isocyanate prepolymer having about 30 percent isocyanate content was formed by reacting toluene diisocyanate (an 80:20 mixture of 2,4- and 2,6-isomers) with a 3:1 molar adduct of propylene oxide to glycerine formed in the presence of an inorganic base catalyst. The prepolymer in the amount of 6.3 g was rapidly mixed at room temperature with 15.0 g of a mixture of 90 percent aliphatic polyoxyalkylene triol (sold under the tradename VORANOL 4701 by the Dow Chemical Company) and 10 percent diethylene glycol.

Various catalysts were added to aliquots of the isocyanate-polyol mixture in the amounts shown in Table II. Table II also shows the results of these reactions. A viscosity of less than 10,000 centipoises (cps) is a workable formulation; therefore, the time needed to attain 10,000 cps shows the doctorability period. The reaction conditions for polymerization and curing were 8–20 minutes at 120° C.

TABLE II

| Example No. | Catalyst Compound (Physical State) | Physical State in Polyol | Wt. (g) [php][1] | Viscosity Time to attain 10,000 cps at R.T. (mins.)[2] | Rate of Polymerization Time for polymer film to be tack free at 120° C. (mins.) |
|---|---|---|---|---|---|
| 1 | 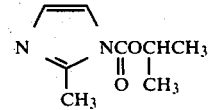 (liquid) | Clear Solution | 0.23 [1.53] | 16 | 16 |
| 2 | (liquid) | Clear Solution | 0.29 [1.93] | 14 | 14 |
| 3 | (liquid) | Clear Solution with DMF[3] (1 ml) | 0.25 [1.67] | 25.5 | 20 |
| 4 | 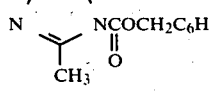 (liquid) | Clear Solution | 0.21 [1.40] | 18 | 18 |
| 5 | 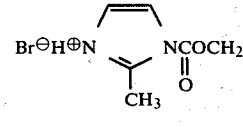 (solid) | Oil Dispersion with DMF (1 ml) | 0.41 [2.73] | 1,100 cps at 30 mins. | 14 |

TABLE II-continued

| Example No. | Catalyst Compound (Physical State) | Physical State in Polyol | Wt. (g) [php][1] | Viscosity Time to attain 10,000 cps at R.T. (mins.)[2] | Rate of Polymerization Time for polymer film to be tack free at 120° C. (mins.) |
|---|---|---|---|---|---|
| 6 | $^{\ominus}O_2C(CH_2)_4CO_2H$ with H$^{\oplus}$N—C(CH$_3$)=CH—NCOCH$_3$ ring (solid) | Clear Solution with DMF (1 ml) | 0.39 [2.60] | 23.5 | 10 |
| 7 | $^{\ominus}O_2C(CH_2)_4CO_2H$ with H$^{\oplus}$N—C(CH$_3$)=CH—NCOCH$_2$C$_6$H$_5$ ring (solid) | Clear Solution with DMF (1 ml) | 0.49 [3.27] | 21.75 | 8 |
| 8 | $^{\ominus}O_2C(CH_2)_4CO_2H$ with H$^{\oplus}$N—C(CH$_3$)=CH—NCOCH(CH$_3$) ring (solid) | Clear Solution with DMF (1 ml) | 0.43 [2.87] | 8,400 cps at 30 mins. | 15.5 |

[1] Parts per hundred polyol
[2] R.T. = room temperature
<10,000 cps is a workable formulation
[3] DMF = dimethylformamide

COMPARATIVE EXAMPLES

These examples are for comparison purposes only and are not embodiments of the present invention. The same procedure was followed as in Examples 1–8. Table III shows the catalytic amounts used and the results obtained.

TABLE III

| Catalyst Compound (Physical State) | Physical State in Polyol | Wt. (g) [php][1] | Viscosity Time to attain 10,000 cps at R.T. (mins.)[2] | Rate of Polymerization Time for polymer film to be tack free at 120° C. (mins.) |
|---|---|---|---|---|
| Blank | Clear Solution | — | 75 | ~68 |
| Blank | Clear Solution with DMF[3] (1 ml) | — | >30 | >25 not cured |
| N—NH—C(CH$_3$)=CH ring (solid) | Clear Solution | 0.30 [2.00] | 1 | 1 |

[1] Parts per hundred polyol
[2] R.T. = room temperature >10,000 cps is a workable formulation
[3] DMF = dimethylformamide The comparative examples have either a long curing time (tack free time) or a nonexistent doctorability time. The present invention as illustrated by Examples 1–8 has a sufficient doctorability time, yet a short curing time.

What is claimed is:

1. A process for preparing a polyurethane comprising reacting
   (a) an organic compound bearing more than one reactive isocyanato group; and
   (b) an organic compound bearing more than one alcoholic hydroxyl group; in the presence of (c) a catalyst to catalyze the reaction between (a) and (b) at elevated temperatures; said catalyst corresponding to the formula

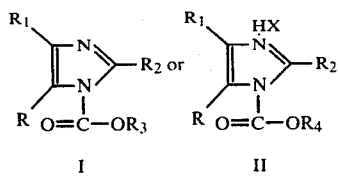

wherein R, $R_1$, and $R_2$ are each independently H, hydrocarbyl or an inertly-substituted hydrocarbyl; $R_3$ and $R_4$ are each independently hydrocarbyl or an inertly-substituted hydrocarbyl; and X is an anion.

2. The process defined by claim 1, in which (a) is an organic polyisocyanate and (b) is an aliphatic polyol.

3. The process defined by claim 2, in which (b) is a polyether polyol or a polyester polyol.

4. The process defined by claim 1, in which $R_3$ and $R_4$ are each independently lower alkyl or phenol substituted compounds.

5. The process defined by claim 3, in which $R_3$ is ethyl, isopropyl, or benzyl.

6. The process defined by claim 5, in which R, $R_1$, and $R_2$ are each H or $CH_3$.

7. The process defined by claim 4, in which $R_4$ is methyl, ethyl, i-propyl, or t-butyl and HX is an adipic acid.

8. The process defined by claim 1, in which (a) is a toluene diisocyanate, (b) is a polyoxyalkylene triol and glycol mixture, and (c) is t-butyl imidazole-N-carboxylate at a temperature of 120° C.

9. A composition foamable in the presence of a blowing agent at elevated temperatures comprising
(a) an organic compound bearing more than one reactive isocyanato group;
(b) an organic compound bearing more than one alcoholic hydroxyl group; and
(c) a catalyst to catalyze the reaction between (a) and (b), said catalyst corresponding to the formula

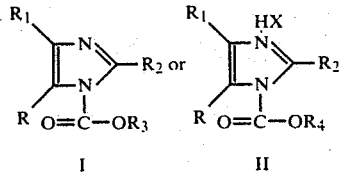

wherein R, $R_1$, and $R_2$ are each independently H, hydrocarbyl or an inertly-substituted hydrocarbyl; $R_3$ and $R_4$ are each independently hydrocarbyl or an inertly-substituted hydrocarbyl; and X is an anion.

* * * * *

UNITED STATES PATENT AND TRADEMARK OFFICE
CERTIFICATE OF CORRECTION

PATENT NO. : 4,189,543

DATED : February 19, 1980

INVENTOR(S) : George A. Doorakian and Lawrence G. Duquette

It is certified that error appears in the above-identified patent and that said Letters Patent are hereby corrected as shown below:

Col. 1, line 55, delete " 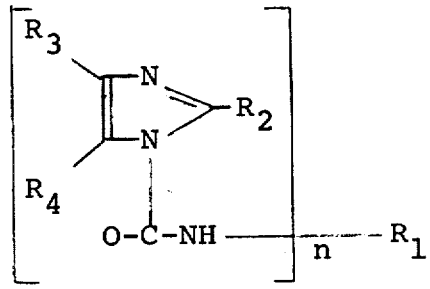 "

and insert -- 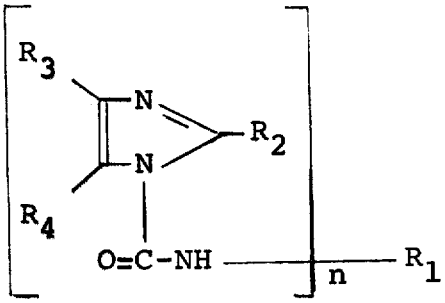 --

UNITED STATES PATENT AND TRADEMARK OFFICE
CERTIFICATE OF CORRECTION

PATENT NO. : 4,189,543

DATED : February 19, 1980

INVENTOR(S) : George A. Doorakian and Lawrence G. Duquette

It is certified that error appears in the above-identified patent and that said Letters Patent are hereby corrected as shown below:

Col. 4, line 15, delete "by the Dow" and insert --by The Dow--.

Col. 5, at the superscript 2 below Table III, delete "R.T. = room temperature $>$10,000 cps is a workable formulation" and insert --R.T. = room temperature $<$10,000 cps is a workable formulation--.

Signed and Sealed this

Fifth Day of August 1980

[SEAL]

Attest:

SIDNEY A. DIAMOND

Attesting Officer

Commissioner of Patents and Trademarks